United States Patent [19]
Spector

[11] Patent Number: 6,039,327
[45] Date of Patent: Mar. 21, 2000

[54] ANIMAL-LIKE RIDE-ON TOY VEHICLE

[76] Inventor: Donald Spector, 380 Mountain Rd., Union City, N.J. 07080

[21] Appl. No.: 08/874,520

[22] Filed: Jun. 13, 1997

Related U.S. Application Data

[63] Continuation-in-part of application No. 08/840,655, Apr. 25, 1997, Pat. No. 5,813,896.

[51] Int. Cl.[7] .................................................. A63G 19/00
[52] U.S. Cl. ..................... 280/7.021; 280/1.13; 446/226
[58] Field of Search .................................. 280/1.13, 1.16, 280/1.165, 1.167, 1.188, 1.201, 1.208, 87.01, 87.021, 8.03, 87.05, 87.041; 448/221, 226

[56] References Cited

U.S. PATENT DOCUMENTS

| | | | |
|---|---|---|---|
| 1,634,189 | 6/1927 | Henry | 446/226 |
| 2,627,419 | 2/1953 | Lindenbein | 280/1.188 |
| 3,065,567 | 11/1962 | Lemelson | 446/226 |
| 3,884,495 | 5/1975 | Petock | 280/87.041 |
| 4,023,816 | 5/1977 | Ellman et al. | 280/1.13 |
| 4,037,833 | 7/1977 | Anderson | 280/1.13 |
| 4,895,546 | 1/1990 | Rakonjac | 446/221 |
| 5,022,666 | 6/1991 | Simon | 280/1.13 |
| 5,335,436 | 8/1994 | Gurr | 446/226 |

FOREIGN PATENT DOCUMENTS

| | | | |
|---|---|---|---|
| 1134344 | 4/1957 | France | 280/1.13 |

*Primary Examiner*—Paul N. Dickson
*Assistant Examiner*—Frank Vanaman
*Attorney, Agent, or Firm*—Michael Ebert

[57] ABSTRACT

A ride-on vehicle for a pre-school child in the form of a four-legged animal-like figure on wheels propelled by the feet of a child astride the figure. The figure which is mounted on a platform supported on a pair of front wheels and a pair of rear wheels is composed of a collapsible fabric casing shaped to define the animal-like form and at least one bladder within the casing which when inflated, then erects the figure. The fabric forelegs of the figure extend over the sides of the front wheels and the fabric rear legs of the figure extend over the sides of the rear wheels whereby the wheels are concealed and the child astride the figure appears to be riding the figure, not the platform.

5 Claims, 2 Drawing Sheets

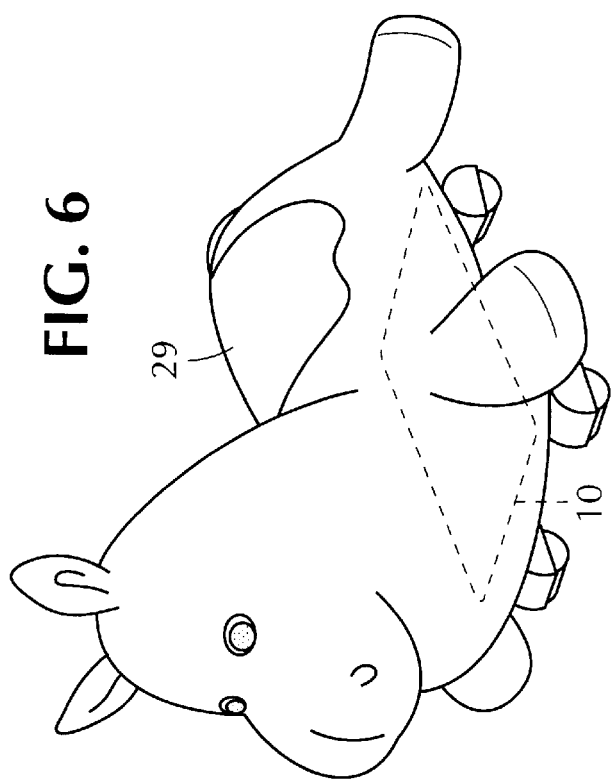
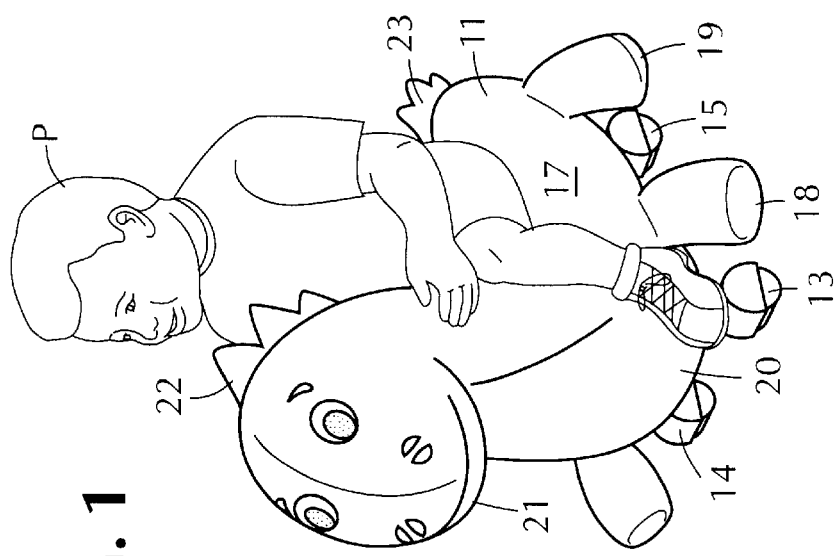
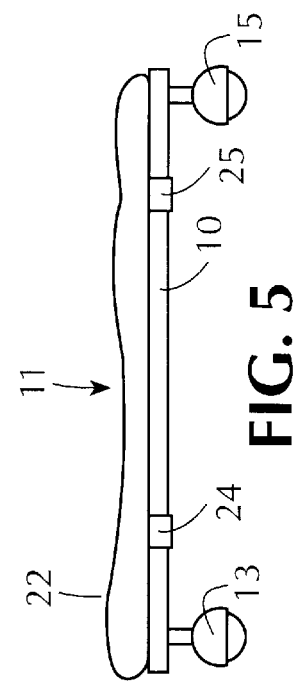
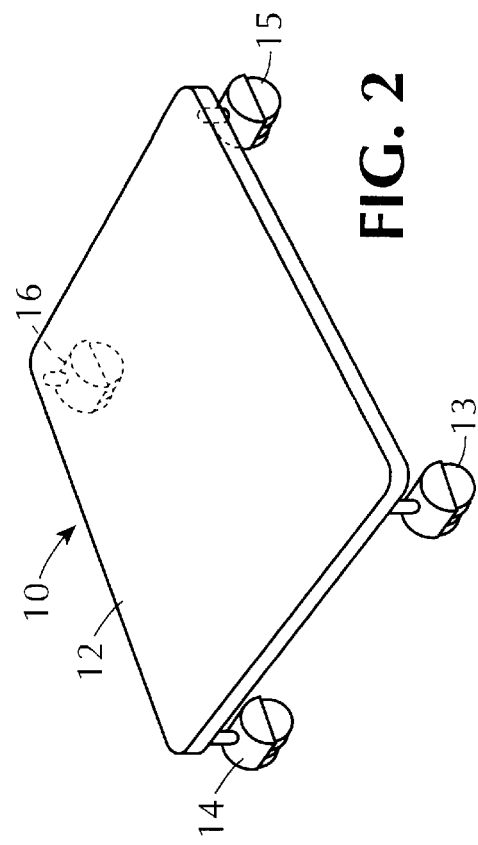

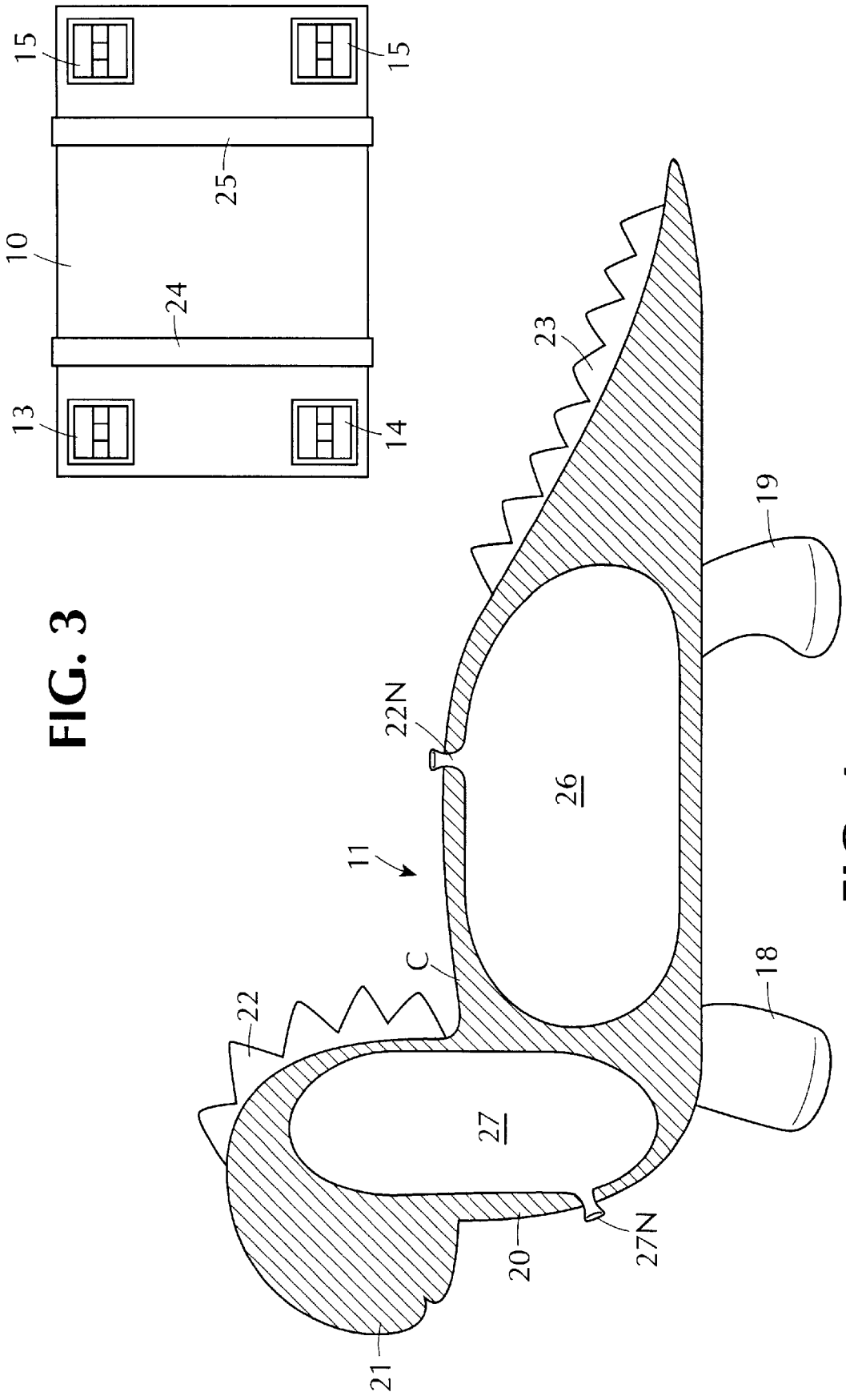

ANIMAL-LIKE RIDE-ON TOY VEHICLE

Related Application

This application is a continuation-in-part of the copending Spector application Ser. No. 08/840,655, filed Apr. 25, 1997, entitled COLLAPSIBLE STUFFED TOY FIGURE U.S. Pat. No. 5,8,123,896.

BACKGROUND OF THE INVENTION

1. Field of Invention

This invention relates generally to ride-on toy vehicles for pre-school children in the form of a small animal-like figure on wheels which is pushed and propelled by a child astride the figure by the feet of the child, and more particularly to a vehicle of this type in which the figure is formed by a collapsible fabric casing enclosing at least one inflated bladder.

2. Status of Prior Art

The historic precursor of a vehicle in the form of a four-legged animal-like figure on wheels is the Trojan horse formed by a large hollow wooden horse on wheels. This horse which according to Homer was wheeled into the open gates of Troy, had hidden in its torso Greek warriors.

A modern version of the Trojan horse popular with pre-school children whose ages are in the one to three years range is constituted by, a hollow, four-legged animal figure, such as one resembling a pony, molded of rigid synthetic plastic material. This plastic figure is mounted on four wheels to create a ride-on vehicle. The dimensions of the vehicle are such that a child astride the pony and holding onto its neck can reach the ground with his feet, and then use his feet to push and propel the toy vehicle.

While children enjoy playing with a ride-on toy vehicle of this type, for the child is then riding, as it were, on his own pony, the nature of this toy is such as to penalize the parents of the child.

A child of 3 years of age, when vigorously pushing a animal-like plastic figure on wheels in an indoor area will often collide with a wall as well as with furniture in the path of this toy vehicles The effect of a collision is usually not serious, but at the very least it will leave bump marks on the walls and furniture. And in some cases, when the vehicle moving a fairly high speed collides with a wall, the child astride the vehicle will then be thrust forward and he may strike his head against the rigid head of the plastic figure and be injured thereby.

In my above-identified copending application, there is disclosed a fabric-covered stuffed toy figure having a head joined by a flexible neck to a torso to which are hinged arm and leg appendages. The fabric casing of the head is stuffed by an inflated balloon and the fabric casing of the torso is stuffed by another balloon, whereas the fabric sleeves of the appendages are stuffed with compressible padding. To facilitate packaging, storage and shipment, the figure can be collapsed by deflating the balloons, thereby flattening the head and torso.

Packaging and shipping costs of a toy are important commercial considerations. The size of a toy dictates the box required to package and ship it, the larger the box the greater are packaging and shipping costs. Also the larger the box, the greater is the shelf space required to display the toy in a retail store and in storing the toy.

In a toy vehicle in accordance with the invention, an animal-like figure mounted on a wheeled platform is formed by a collapsible fabric casing having balloons or bladders inflated therein to erect the figure. When the figure is collapsed, the toy is then far more compact and can be packaged in a relatively small box.

Of background interest is the Ochs U.S. Pat. No. 2,685,758 which discloses an inflatable toy formed by an outer fabric casing shaped to represent Humpty Dumpty, within which is an inflated balloon.

SUMMARY OF INVENTION

In view of the foregoing, the main object of this invention is to provide a ride-on vehicle for pre-school children in the form of a soft four-legged animal figure on wheels which is propelled by the feet of a child astride the figure.

More particularly, an object of this invention is to provide a ride-on vehicle of the above type in which the soft figure is formed by a collapsible fabric casing shaped to define the figure and at least one bladder within the casing which when inflated erects the figure.

Also an object of the invention is to provide a soft figure of the above type which is mounted on a rigid platform having a pair of front wheels and a pair of rear wheels, the fabric forelegs of the figure overlying the animal-like sides of the front wheels and the fabric rear legs overlying the sides of the rear wheels whereby the animal-like figure conceals the wheeled platform and the child appears to be riding the figure, not the platform.

Among the advantages of a toy ride-on vehicle in accordance with the invention are the following:

A. the soft figure of the vehicle acts to cushion the child astride the figure to provide a comfortable ride;

B. the vehicle is cushioned from collisions with walls and furniture thereby preventing bump marks or other types of damage; and C. the soft figure is collapsible, whereby the vehicle is then more compact for storage and shipment.

Briefly stated, these objects are attained by a ride-on vehicle for a pre-school child in the form of a four-legged animal-like figure on wheel propelled by the feet of a child astride the figure. The figure which is mounted on a platform supported on a pair of front wheels and a pair of rear wheels is composed of a collapsible fabric casing shaped to define the figure and at least one bladder within the casing which when inflated, then erects the figure. The fabric forelegs of the figure extend over the sides and the front wheels and the fabric rear legs of the figure extend over the sides of the rear wheels whereby the wheels are concealed and the child astride the figure, appears to be riding the figure not the platform.

BRIEF DESCRIPTION OF DRAWING

For a better understanding of the invention as well as other objects and further features thereof, reference is made to the following detailed description to be read in conjunction with the accompanying drawings, wherein:

FIG. 1 is a perspective view of one preferred embodiment of a ride-on toy vehicle in accordance with the invention in which a four-legged animal-like figure is mounted on a wheeled platform;

FIG. 2 is a separate view of the wheeled platform;

FIG. 3 shows the underside of the platform to which the animal-like figure is strapped;

FIG. 4 is a longitudinal section taken through the animal-like figure shown in FIG. 1 to reveal the inflated balloons which erect this figure;

FIG. 5 shows the vehicle when it is collapsed; and

FIG. 6 illustrates another embodiment of the toy vehicle, the figure in this embodiment resembling a pony.

DESCRIPTION OF INVENTION

Referring now to FIGS. 1 to 4 which show a preferred embodiment of a ride-on vehicle in accordance with the invention, it will be seen that the main components of this vehicle are a platform 10 and a soft, four-legged animal-like FIG. 11 mounted on this platform. The FIG. 11 shown in FIG. 1 does not resemble any known four-legged animal, such as a horse or bear, but is fanciful, looking somewhat like a tame dinosaur.

As shown separately in FIG. 2, platform 10 is formed of a generally-rectangular plate 12 having rounded corners, molded of light weight, high-strength synthetic plastic material, such as PVC or polyethylene. Below the platform and attached thereto adjacent its four corners are a pair of front wheels 13 and 14 and a pair of rear wheels 15 and 16. The wheels which are supported on vertical posts are free to turn about these posts in the manner of casters. In this way, the platform can be pushed in any direction by a child riding the vehicle.

Soft animal-like FIG. 11 mounted on platform 10 includes a torso section 17 which lies on the platform along its length. Hinged to the front end of torso 17 and depending therefrom is a pair of forelegs 18 which extend over the sides of front wheels 13 and 14. Hinged to the rear end of torso 17 and depending therefrom is a pair of rear legs 19 which extend over the sides of rear wheels 15 and 16. Hence the wheels of the platform are effectively concealed by the torso leg appendages.

Integral with the front end of torso 17 is an upwardly extending neck 20 joined to a shaped head 21 provided with a mane 22. Attached to the rear of torso section 17 is a tail section 23.

The entire figure, as best seen in FIG. 4, is encased in an inelastic fabric casing C which is contoured to define all of the components of the four-legged figure. The casing may be made of plush fabric, as in a stuffed Teddy Bear, or of any other suitable woven-fiber fabric or cloth that is contour-cut and sewed to define the casing. The casing is provided at its underside with adjustable straps 24 and 25 which encircle the platform and serve to join the animal-like FIG. 11 to platform 10, as shown in FIG. 3. In practice, the platform may be inserted within the fabric casing against the underside of torso 17, with the wheel posts of the platform going through openings in the casing, thereby integrating the platform with the casing.

The fabric leg appendages 18 and 19 of the figure which are hinged to fabric torso 17 are stuffed with compressible material, such as cotton batting or flexible plastic foam, so that these appendages are soft. Also stuffed with such material is tail 23 protruding form the rear of torso 17.

But the main portions of the animal like figure, which account for most of its volume, are not stuffed with padding, but by inflated balloons. Thus, as shown in FIG. 4, disposed within torso section 17 is a balloon 26 whose mouth-inflated neck 22 N projects through a slit in the casing.

By blowing up this balloon and then tying neck 26N to seal the balloon and pushing the tied neck under the slot, one can erect the torso section of the figure so that it assumes its proper three-dimensional shape. Because the balloon is confined within the torso section of the casing, when the balloon is inflated its rubber skin is stretched to conform to the wall of the casing, causing the inflated balloon to assume the shape of the torso.

An unconfined balloon, when inflated, assumes a globular form, and the balloon is then easily ruptured by applying pressure thereto which causes the skin to stretch beyond its elastic limit. But when a balloon is inflated within a confined inelastic casing, it cannot be stretched beyond its elastic limits, and the load of a child seated on the casing will not cause the balloon to rupture.

Enclosed within neck 20 and head 21 sections of casing C is a second balloon 27 having a neck 27N. This balloon, when inflated, erects these sections of the animal-like figure whose other portions are stuffed with compressible padding.

The dimensions of the animal-like FIG. 11 are such that when a preschool child P, as shown in FIG. 1, sits astride the figure and holds onto its neck, with the child's legs straddling torso 17, the feet of the child will then reach the ground. It then becomes an easy matter for the child to push the vehicle forward with his feet and thereby propel it in any desired direction, for the wheels will orient themselves to travel in any direction.

Because the figure is soft and pneumatic, it is comfortable for the child to ride. And even though the child may collide the vehicle into a wall of the indoor facility in which he is playing, or into an article of furniture, no damage will be inflicted by this collision, for the figure of the vehicle is soft and yielding. And should the collision be such as to thrust the child forward and cause him to strike the head of the figure, this soft head will inflict no damage on the child.

As the child propels the vehicle, one is not aware that the vehicle is on wheels, for these wheels are concealed by the fabric leg appendages of the animal-like figure. Hence one gets the impression that the child is riding a four-legged animal, not a wheeled platform.

Because FIG. 11 is collapsible, the ride-on vehicle can for purposes of storage and shipment be made quite compact so that it can be fitted in a shallow box. Thus as shown in FIG. 5, the collapsed animal-like FIG. 11 which lies on platform 10 has a reduced height above the platform. When the collapsed vehicle is taken out of its box or out of storage, it is then a simple matter to erect the figure by inserting balloons therein and inflating and sealing these balloons. To collapse the figure, one has only to puncture the balloons and remove them from the figure.

While two balloons have been disclosed for erecting the figure, one may instead provide a single molded bladder similar to that used in a football, the bladder being shaped to conform to the torso, neck and head sections of the figure. Hence by blowing up this bladder one may erect the entire figure.

The appearance of the four-legged figure included in the ride-on vehicle plays an important role in the attractiveness of the vehicle to the child who rides on it. Thus while a child may enjoy riding a dinosaur-looking four-legged figure of the type shown in FIG. 1, he may prefer to ride a figure that looks more like a pony, such as FIG. 29 shown in FIG. 6, which is mounted on platform 10, just as is the figure in FIG. 1.

While there has been shown and described preferred embodiments of an animal-like ride-on toy vehicle in accordance with the invention, it will be appreciated that many changes and modifications may be made therein without, however, departing from the essential spirit thereof. Thus the neck of the figure may be provided with a coupling ring that is attachable to a leash, so that the child may pull the animal-like figure of the vehicle as if it were a pet. And instead of a plate-like platform, as shown, the platform may be in a form of a rectangular framework.

I claim:

1. A ride-on vehicle for a pre-school child comprising:
   A. a generally rectangular rolling platform having attached thereto adjacent its four corners a pair of front wheels and a pair of rear wheels; and
   B. a soft, four-legged simulated animal figure mounted on the platform, said figure having soft foreleg appendages which extend below the platform over the sides of the front wheels and soft rear leg appendages which extend below the platform over the sides of the rear wheels to effectively conceal the wheels whereby as a child who sits astride the figure propels the platform by pushing it with his feet engaging the ground the child appears to be riding the animal, not the platform, said figure having a torso section to which the appendages are hinged and a neck section extending upwardly from the front of the torso section and joined to a head section.

2. A ride-on vehicle as set forth in claim 1, in which the figure includes a fabric casing that is contoured to define the sections of the figure, and inflatable pneumatic means within these sections to erect them.

3. A ride-on vehicle as set forth in claim 2, in which the pneumatic means are constituted by a first balloon inflated in the torso section and a second balloon inflated in the neck and head sections.

4. A ride-on vehicle as set forth in claim 2, in which said appendages are stuffed with compressible material.

5. A ride-on vehicle as set forth in claim 4, in which the compressible material is cotton batting.

* * * * *